(12) United States Patent
Hackworth et al.

(10) Patent No.: US 7,457,866 B1
(45) Date of Patent: Nov. 25, 2008

(54) METHOD AND APPARATUS FOR DIAGNOSING CONNECTIVITY PROBLEMS FROM A NETWORK MANAGEMENT STATION

(75) Inventors: Brian M. Hackworth, San Jose, CA (US); Sahn Lam, Daly City, CA (US)

(73) Assignee: NetApp, Inc., Sunnyvale, CA (US)

( * ) Notice: Subject to any disclaimer, the term of this patent is extended or adjusted under 35 U.S.C. 154(b) by 782 days.

(21) Appl. No.: 10/396,935

(22) Filed: Mar. 24, 2003

(51) Int. Cl.
*G06F 15/173* (2006.01)

(52) U.S. Cl. ........................ 709/224; 709/223; 709/227

(58) Field of Classification Search ................ 709/224, 709/223, 227
See application file for complete search history.

(56) References Cited

U.S. PATENT DOCUMENTS

| | | | | |
|---|---|---|---|---|
| 4,937,825 A | * | 6/1990 | Ballard et al. | 714/712 |
| 5,815,652 A | * | 9/1998 | Ote et al. | 714/31 |
| 6,941,356 B2 | * | 9/2005 | Meyerson | 709/220 |
| 7,007,094 B1 | * | 2/2006 | Linderman | 709/230 |
| 7,010,593 B2 | * | 3/2006 | Raymond | 709/224 |
| 7,069,480 B1 | * | 6/2006 | Lovy et al. | 714/57 |
| 2001/0035977 A1 | * | 11/2001 | Adler et al. | 358/1.15 |
| 2001/0056486 A1 | * | 12/2001 | Kosaka | 709/224 |
| 2002/0152292 A1 | * | 10/2002 | Motoyama et al. | 709/223 |
| 2002/0174198 A1 | * | 11/2002 | Halter | 709/220 |
| 2003/0005178 A1 | * | 1/2003 | Hemsath | 709/328 |
| 2003/0093563 A1 | * | 5/2003 | Young et al. | 709/245 |
| 2004/0064725 A1 | * | 4/2004 | Padmanabhan et al. | 713/201 |
| 2004/0088386 A1 | * | 5/2004 | Aggarwal | 709/220 |
| 2004/0098617 A1 | * | 5/2004 | Sekar | 713/201 |

OTHER PUBLICATIONS

Aaron Skonnard, "SOAP: The Simple Object Access Protocol", Microsoft Internet Developer, Jan. 2000.*

* cited by examiner

*Primary Examiner*—William C Vaughn, Jr.
*Assistant Examiner*—Mohamed Ibrahim
(74) *Attorney, Agent, or Firm*—Perkins Coie LLP

(57) ABSTRACT

A network management station manages multiple devices on a network, which may include storage appliances, caching appliances, and other devices. The network management station includes software that assists a network administrator by diagnosing a connectivity problem relating to a device on the network. To diagnose the connectivity problem, the software attempts to communicate with the device from the management station by separately using each of multiple communication protocols, including one or more device type-specific protocols. The software identifies possible causes for the connectivity problem based on the results of using the different protocols. The software generates a graphical user interface indicating the individual results of attempting to communicate with the device using the different protocols and the possible causes for the connectivity problem. Based on the information presented, the administrator can more effectively troubleshoot the connectivity problem.

43 Claims, 13 Drawing Sheets

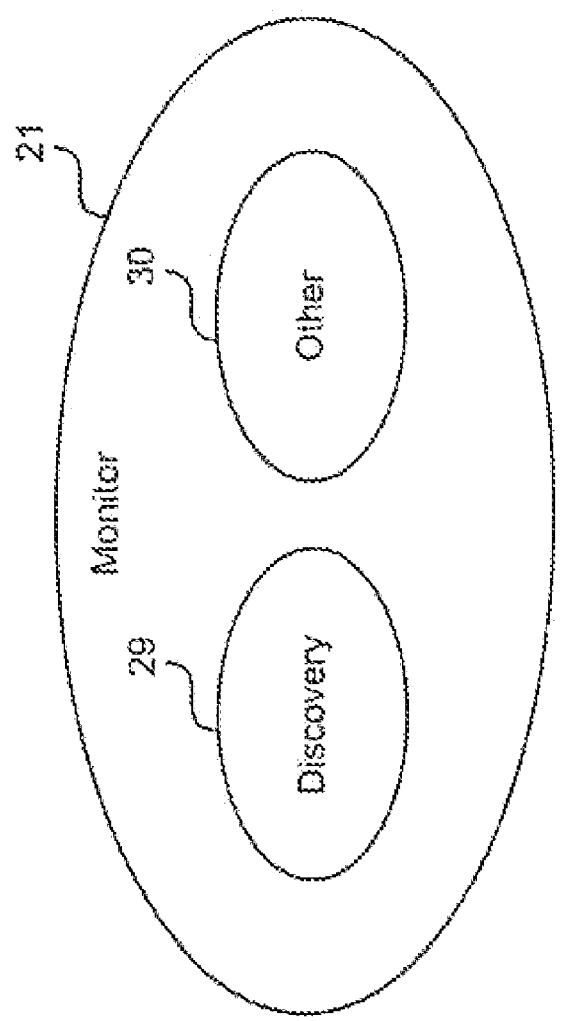

Appliances, All

Help ?
10J

| Summary | Appliances | File Systems | SANS | Quotas | Streaming | Ever |

Global    View [Appliances, All]

Appliances: 1-18 of 18

| | Type | Status | Appliance | Model | System ID |
|---|---|---|---|---|---|
| ☐ | | ● | beany.lab.netapp.com | FAS940 | 0050371364 |
| ☐ | | ● | cecil.lab.netapp.com | FAS940 | 0050371375 |
| ☐ | | ● | cooker.lab.netapp.com | F85 | 0033581265 |
| ☐ | | ● | danzig.lab.netapp.com | C1105 | BACH1040825 |
| ☐ | | ● | dewalt.lab.netapp.com | | 0016778992 |
| ☐ | | ⊚ | fryer.lab.netapp.com | F820 | 0033611710 |
| ☐ | | ● | hackwort1.sim.netapp.com | Simulator | 0000000011 |
| ☐ | | ⊚ | jayna.lab.netapp.com | F840 | 0033589432 |
| ☐ | | ● | jeckle.lab.netapp.com | F740 | 0016801791 |
| ☐ | | ● | magilla.lab.netapp.com | FAS960 | 0050389077 |
| ☐ | | ● | potty.lab.netapp.com | F87 | 0184588913 |
| ☐ | | ● | steamer.lab.netapp.com | F87 | 0050368922 |
| ☐ | | ● | swartz.lab.netapp.com | C1100 | BACH1171448 |
| ☐ | | ⊚ | sweetpea.lab.netapp.com | F820 | 0033588992 |
| ☐ | | ⊚ | tweely.lab.netapp.com | F820 | 0033611543 |
| ☐ | | ● | viking.lab.netapp.com | F740 | 0016796704 |
| ☐ | | ⊚ | weber.lab.netapp.com | F740 | 0016794931 |
| ☐ | | ⊚ | zan.lab.netapp.com | F840 | 0033589435 |

Appliances: 1-18 of 18

31

Select All – Unselect All

[-- Choose Group --▼] [Add]   [Delete]        [_____] [Add]
                      (From DataFabric        (New appliance)
                          Manager)

*FIG. 3*

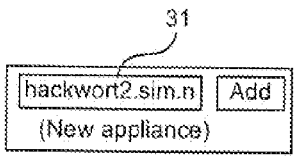

*FIG. 4*

Appliances, All

⚠ Error: Can't contact new host hackwort2.sim.netapp.com. Click here to troubleshoot.

| Summary | Appliances | File Systems | SANS | Quotas | Streaming | Ever |

🌐 Global      View [Appliances, All]

Appliances: 1-18 of 18

| | Type | Status | Appliance | Model | System ID |
|---|---|---|---|---|---|
| ☐ | 📦 | ● | beany.lab.netapp.com | FAS940 | 0050371364 |
| ☐ | 📦 | ● | cecil.lab.netapp.com | FAS940 | 0050371375 |

*FIG. 6*

Diagnostics – hackwort2.sim.netapp.com

Help ⓘ
10 Jan 14:03

Network Connectivity

| | | |
|---|---|---|
| IP Address | 10.56.17.161 | |
| Network | None | |
| DNS Aliases | hackwort2.sim.netapp.com | |
| DNS Addresses | 10.56.17.161 | |
| SNMP | ⊙ Timed out (4548 ms) | (Is SNMP enabled?) |
| SNMP Community | public | (Edit SNMP community) |
| ICMP Echo | ⊙ Failed | (Is appliance down?) |
| HTTP | ⊙ Failed | (Is appliance down?) |

*FIG. 7*

METHOD AND APPARATUS FOR DIAGNOSING CONNECTIVITY PROBLEMS FROM A NETWORK MANAGEMENT STATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all rights whatsoever.

FIELD OF THE INVENTION

At least one embodiment of the present invention pertains to diagnosing connectivity problems on a network, and more particularly, to a method and apparatus for diagnosing connectivity problems from a network management station.

BACKGROUND

In most computer networks, system and network administrators use software programs, i.e., network management applications, to monitor the network and to help recognize problems with systems attached to the network. Sometimes either the network management stations or the systems on the network are misconfigured in such a way that the network management stations cannot communicate with the systems on the network or cannot determine the health of the systems on the network. Examples of such misconfigurations include: system names not matching the network addresses being used; passwords being configured differently between management stations and network nodes; and routers and switches being configured to block some network ports between the management stations and network nodes.

A conventional approach to addressing this problem is for network administrators to use various software tools to try to identify the source of the problem. For example, network administrators can use name and address resolution tools on the management station and on the network nodes to ensure that the names and addresses match; they can check passwords on both management station and network nodes to see if they match; and so on. This approach is inadequate, however, because the set of tools continually evolves (making it very difficult to administrators to know which tools are useful), and because the set of tools is different on different network nodes (making it very difficult to apply knowledge learned with one network node to another). What is needed, therefore, is a more effective way of diagnosing connectivity problems from a network management station.

SUMMARY OF THE INVENTION

The invention includes a method and apparatus for a network management station to diagnose a connectivity problem on a network. The method includes detecting a connectivity problem related to accessing a device on the network, attempting to communicate with the device from the network management station by separately using each of multiple communication protocols, and identifying a possible cause for the connectivity problem, based on results of attempting to communicate with the device.

Other features of the present invention will be apparent from the accompanying drawings and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 2B shows elements of the monitor process of the management software;

FIG. 3 is an example of a screen display provided by the management software, including a list of devices managed by the network management station;

FIG. 4 shows how a device can be added to the set of managed devices by using an input field in the screen display of FIG. 3;

FIG. 6 is an example of a screen display that results when a connectivity problem is detected during an attempt to add a device to the set of managed devices;

FIG. 7 is an example of a screen display that results from the diagnostic process;

DETAILED DESCRIPTION

A method and apparatus for a network management station to diagnose a connectivity problem on a network are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

As described in greater detail below, a network management station manages multiple devices on a network, which may include storage appliances, caching appliances, and other devices. The network management station includes network management software that assists a system or network administrator by diagnosing a connectivity problem relating to a device on the network. To diagnose the connectivity problem, the management software attempts to communicate with the device from the management station by separately using each of multiple communication protocols, which may include one or more device type-specific protocols. The management software identifies possible causes for the connectivity problem based on the results of using the different protocols. The software generates a graphical user interface indicating the individual results of attempting to communicate with the device using the different protocols and the possible causes for the connectivity problem. Based on the information presented, the administrator can more effectively troubleshoot the connectivity problem.

One of the barriers to deployment of network management software in general is the time and expertise it takes to get the software set up in a particular network environment. The solution described herein addresses this issue by making it easier for network administrators and other users to configure the management software to work in their networks and helping to find problems and errors elsewhere in the network. The described solution provides diagnostic tools needed for multiple devices in a single place (on a network management station), using them in the appropriate ways for different types of systems on the network, and hiding differences between network diagnostic tools across different management stations and network device operating systems.

Figure 1:
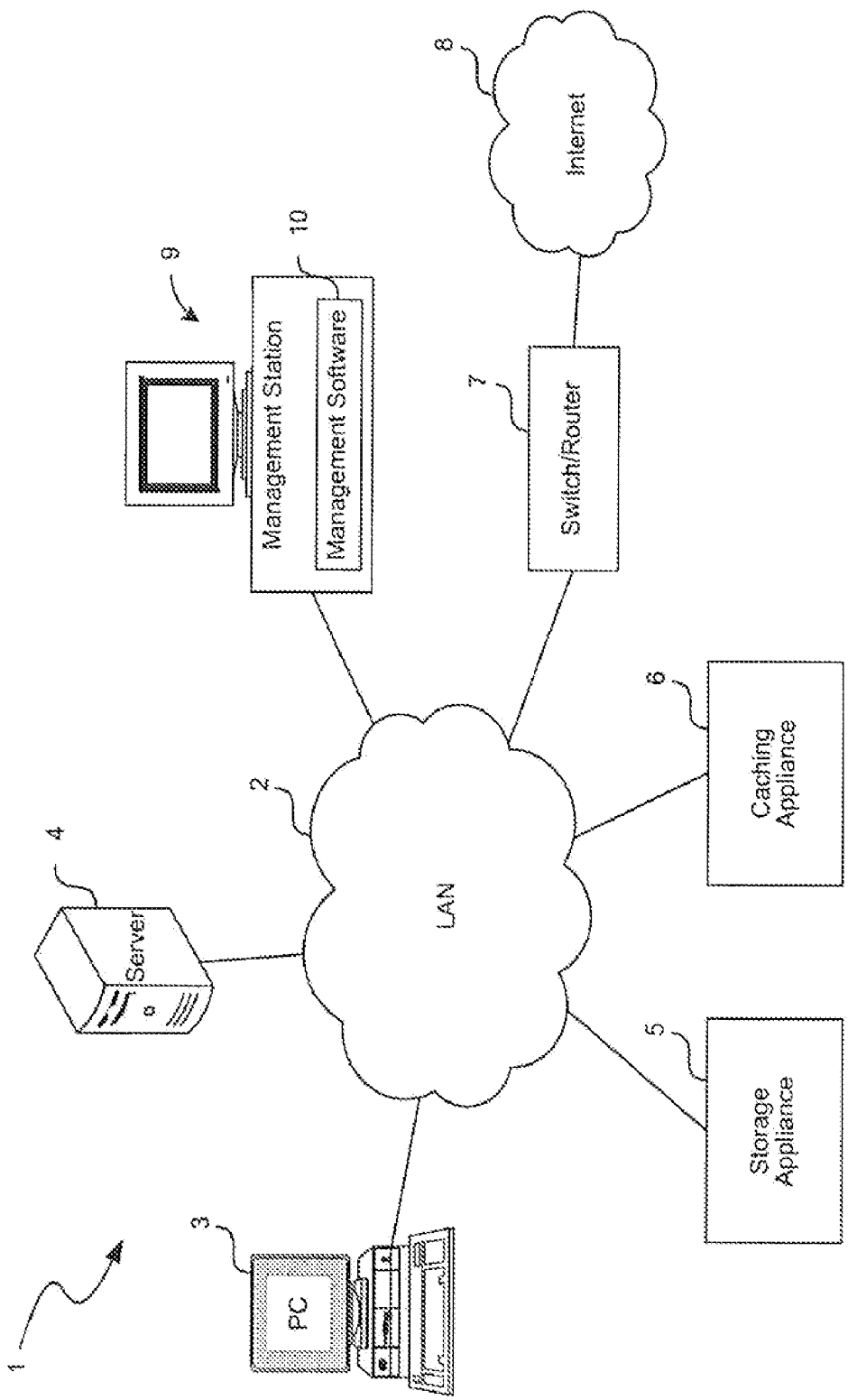
FIG. 1 illustrates a network in which the present invention is employed.

Refer now to FIG. 1, which illustrates a network 1 in which the present invention is employed. The network is based around a local area network (LAN) interconnection 2. However, a wide area network (WAN), virtual private network (VPN) implementation (utilizing communication links over the Internet, for example), or a combination thereof can alternatively be used. Connected on the LAN 2 may be various devices, such as one or more personal computers (PCs) 3, servers 4, network storage appliances 5, and network caching appliances 6. Although only one storage appliance 5 and one caching appliance 6 are shown in FIG. 1, it will be understood that more than one of each of these devices may be connected on the LAN 2 in any given embodiment. The network storage appliances 5 can include appliances that operate as file servers (e.g., "filers"), such as a NetApp® filer made by Network Appliance, Inc. of Sunnyvale, Calif. The network caching appliances 6 can include appliances such as a NetCache®, also made by Network Appliance, Inc.

Also connected to the LAN 2 may be a switch/router 7 that provides a gateway to the well-known Internet 8 for devices on the LAN 2, thereby enabling the devices on the LAN 2 to transmit and receive internet based information, such as e-mail, World Wide Web content, and the like.

Also connected to the LAN 2 is a management station 9. The management station 9 can include a server or PC-based computer with a network interface for communicating over the LAN 2. A network management software application ("management software") 10 resides and executes within the management station 9. The management software 10 enables an administrator or other user to monitor status, performance and usage of devices on the LAN 2, including the storage appliances 5 and caching appliances 6. In certain embodiments, the management station 9 utilizes a simple network management protocol (SNMP) communication process to obtain and manipulate information on the networked devices. SNMP is designed to enable networks to be remotely managed from a centralized management station. In particular, it comprises a packet-based protocol using messaging to communicate with networked devices and clients. The messages are provided as management information blocks (MIBs). The MIBs and SNMP protocol, and their use in providing network management information between SNMP management stations and agents are well-known and are described in, for example, William Stallings, "SNMP, SNMPv2 and RMON", Addison Wesley Publishing Company, 1996. The status, performance and usage information is displayed and manipulated on the station using a graphical user interface (GUI) generated on a display device of the management station 9 or a remote terminal.

Each of the devices attached to LAN 2 includes an appropriate, conventional network interface arrangement (not shown) for communicating over the LAN 2 using desired communication protocols, such as the well-known Transport Control Protocol/Internet Protocol (TCP/IP), User Datagram Protocol (UDP), Hypertext Transfer Protocol (HTTP) or Simple Network Management Protocol (SNMP).

Figure 2A:
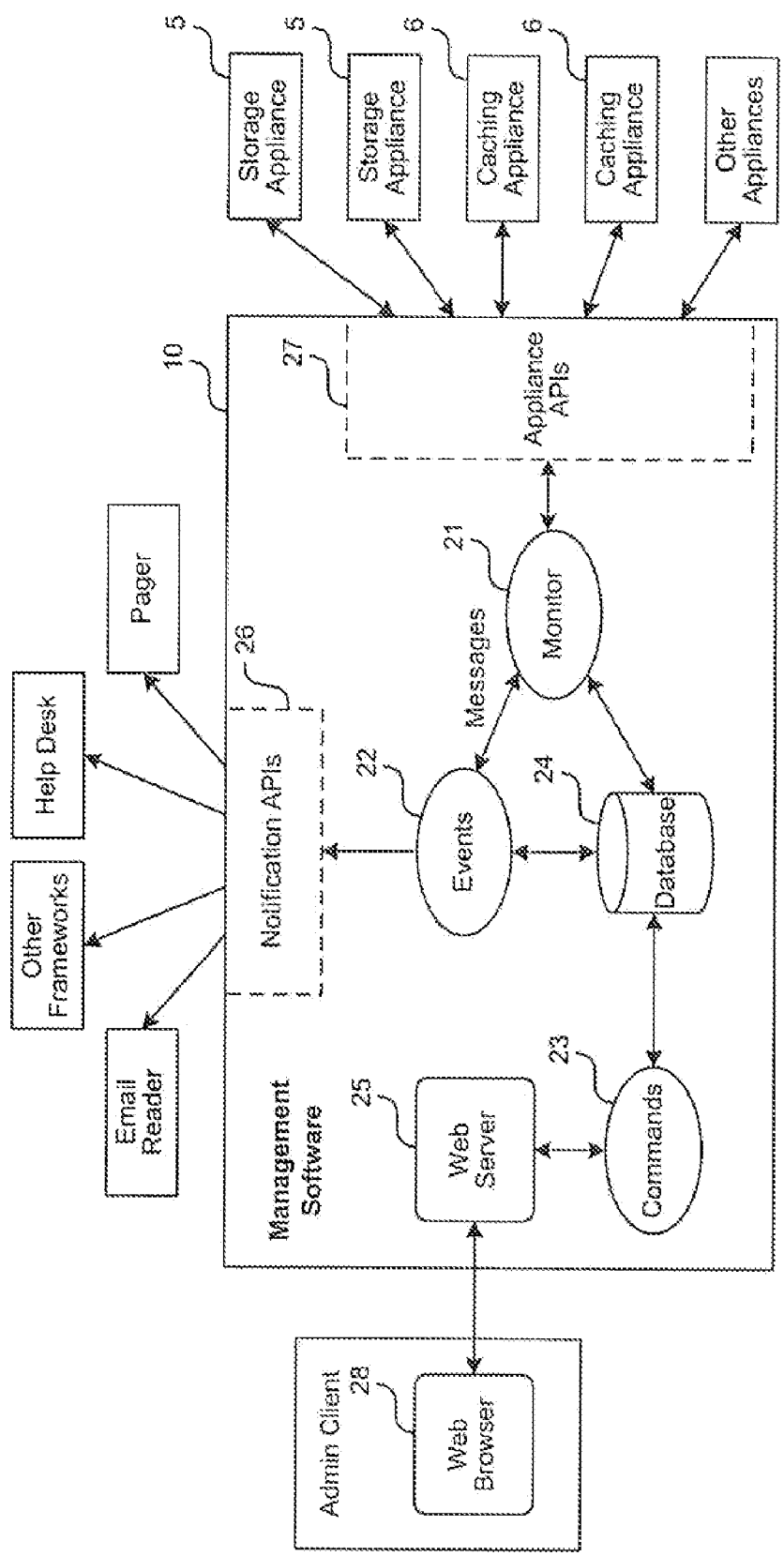
FIG. 2A is a block diagram of the management software and other elements on the network.

FIG. 2A is a block diagram of the management software 10 in relation to other elements on the LAN. In the illustrated embodiment, the management software 10 includes a monitor unit 21, an event unit 22, a command unit 23, a database 24, a Web server 25, a set of notification application programming interfaces (APIs) 26, and a set of appliance APIs 27. In certain embodiments, the monitor unit 21, the event unit 22, and the command unit 23 are executable processes of the management software 10.

The monitor unit 21 includes a variety of sub-units (which may be processes) that continuously examine each appliance or other device in the network to determine if it is behaving within the configured operational parameters. The appliance APIs 27 are used to communicate with the various appliances on the LAN 2. The sub-units monitor parameters such as appliance CPU usage, disk space, temperature, licenses, user quotas, and so on. Each sub-unit saves the results of its operations in the database 24. The monitor unit 21 determines whether an event has been detected regarding the monitored parameters, which requires reporting. The monitor unit 21 can be provided with appropriate threshold values for this purpose, which can be easily stored by an administrator or preset in the database 24. The monitor unit 21 performs a comparison of received statistical information to the threshold information.

Generally the database 24 also includes the names, network addresses, and device types (e.g., storage appliance, caching appliance) of all devices that the management software 10 is managing. The names and addresses may be entered into database 24 either by a network administrator or automatically when the management software 10 discovers the devices. According to one embodiment, the database 24 is a relational-type database. However, any acceptable data storage arrangement can be employed. In this embodiment, the database can be organized and accessed using Structured Query Language (SQL) and the Open DataBase Connectivity (ODBC) standard.

If an event occurs, such as a monitored parameter being out-of-threshold, the monitor unit 21 transmits a message with the details of the event to the event unit 22 using an appropriate messaging protocol, such as hypertext transfer protocol (HTTP). The event unit 22 then queries the database 24 to determine if any interested parties should be notified of the event. If the database 24 contains entries relating to the affected device, these data are returned to the event unit 22. These entries can include web links for related information as well as e-mail addresses, pager numbers, and other communication addresses for the interested parties.

The event unit 22 uses the appropriate notification APIs 26 to generate e-mail messages, pages, or other forms of notification, to notify each interested party, using communication addresses retrieved from the database. In this manner, specific administrators and other users are immediately informed of any critical information involving devices relevant to them. The management station 9 can include an appropriate e-mail server and/or paging application (not shown), which interact with the event unit 22 to facilitate the sending of event notifications. Alternatively, the notification of an event can take the form of an alarm, alert, telephone call, or other messaging mechanism to an interested party that is implemented through appropriate automated systems.

The database 24 is also queried by the command unit 23. The command unit 23 generates web-based reports on particular devices using, for example, a common gateway interface (CGI). CGI can be used as an interface between the command unit 23 and its associated command tools and the Web server 25. Device information is accessed via the Web server 25, which provides Web content (e.g., Web pages) to a Web browser 28 operating in the management station 9, for displayed to an administrator or other interested user. The content can be displayed in any acceptable and useful form, including screen displays such as described below.

As noted above, the monitor unit 21 includes a variety of sub-units (e.g., sub-processes) that examine each appliance or other device in the network to determine if it is behaving within the configured operational parameters. As shown in FIG. 2B, one of these sub-units is a discovery unit 29. The discovery unit 29 attempts to locate new devices on the LAN 2 to begin monitoring them. This discovery process 29 can fail because of configuration mistakes in the network. Until the management station 9 can first communicate with a node on the network, the other monitor sub-processes 30 cannot begin their work.

Accordingly, the management software 10 provides multiple interfaces, including a command line interface and a GUI, to allow administrators to examine a list of the network devices that the management station 9 is managing. FIG. 3 shows an example of the screen display containing such a list.

Figure 5:
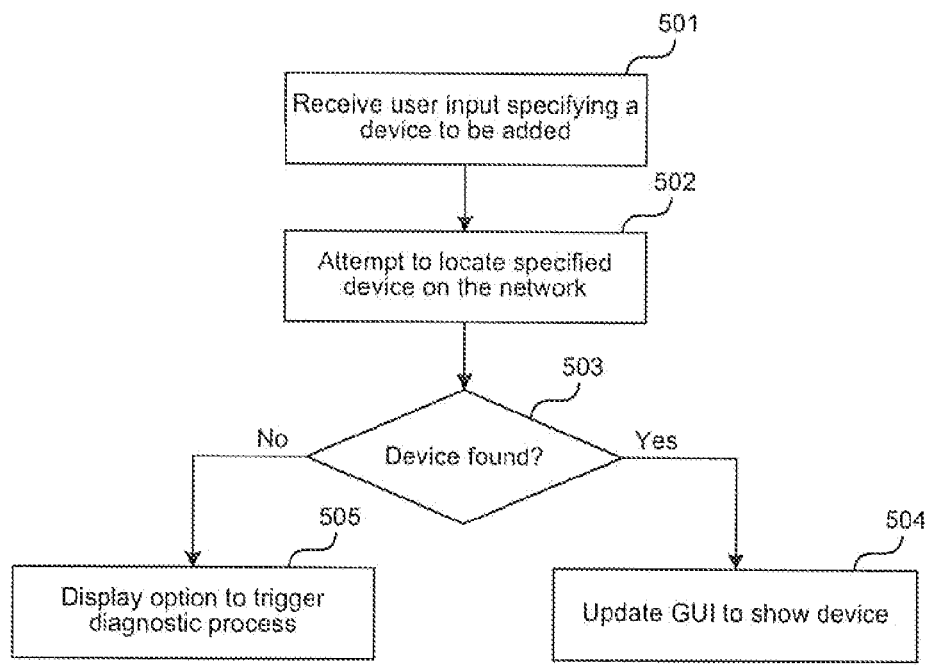
FIG. 5 is a flow diagram showing a process by which the diagnostic process can be initiated.

Referring now to FIGS. 4 and 5, if the administrator determines that a particular device should be included in the list of managed devices but is not, the administrator can input (block 501 in FIG. 5) the name or network address of the device into field 31 in the GUI, as shown in FIG. 4, or into the command line interface, as a request to add the device to the set of managed devices. The management software 10 then attempts to locate the specified device (a host) on the network (block 502). If the device is added successfully, the GUI is updated to show the device among the set of managed devices (block 504).

If this attempt fails for any reason (block 503), the management software 10 offers to diagnose the causes of the failure (block 505). For example, if the management software 10 is unable to locate or communicate with the device to be added, then as shown in FIG. 6, the management software 10 may display an appropriate error message and a prompt, such as "Click here to troubleshoot." The prompt may be a hyperlink, which when activated by the user, initiates a diagnostic process relative to that device. The diagnostic process may be a sub-process of the discovery unit 29 in the monitor unit 21.

To diagnose the possible causes of failure, the diagnostic process uses a set of heuristics to perform several types of tests, to help determine the cause of the connectivity problem. FIG. 7 is an example of a screen display including results of performing the diagnostic process on a device. As shown, the display includes the results (e.g., "Timed out, "Failed") of attempts by the diagnostic process to communicate with the device using several different communication protocols, including SNMP, Internet control message protocol (ICMP) and HTTP.

In addition, the diagnostic process may use one or more device type-specific protocols to attempt to access the device. For example, if the diagnostic process determines that the device is a network caching appliance, then it uses one or more protocols that are specific to that type of network caching appliance, in attempting to access the device. Likewise, if the diagnostic process determines that the device is a network storage appliance, then uses one or more protocols that are specific to that type of network storage appliance, in attempting to access the device. As a more specific example, if a device is a network storage appliance, the diagnostic process may use network data management protocol (NDMP) to communicate with the device. Alternatively, or additionally, if the device is either a network storage appliance or a network caching appliance, the diagnostic process may use a version of extensible markup language (XML) and/or simple object access protocol (SOAP) known to be specific to that type of device, to communicate with the device (e.g., over HTTP).

Figure 8:
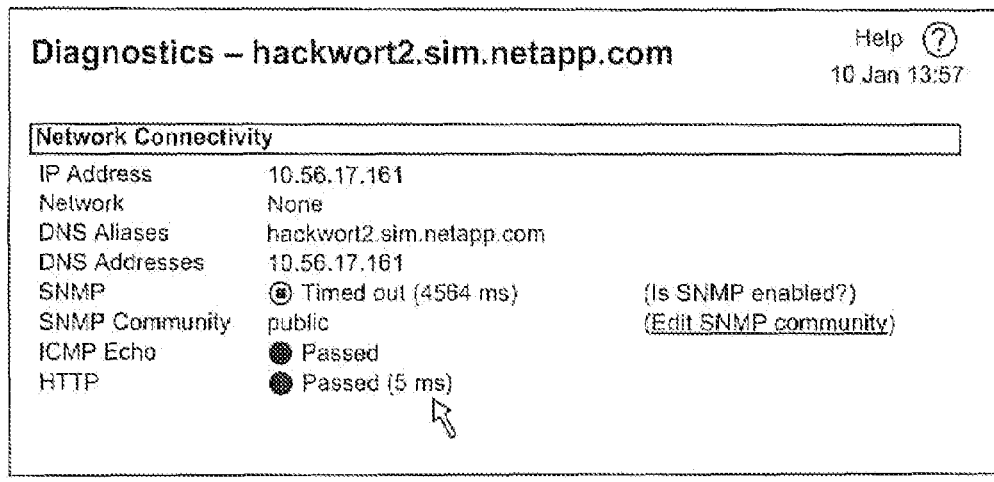
FIGS. 8 and 9 show additional examples of screen displays that may result from the diagnostic process, such as after performing troubleshooting procedures.
Figure 9:
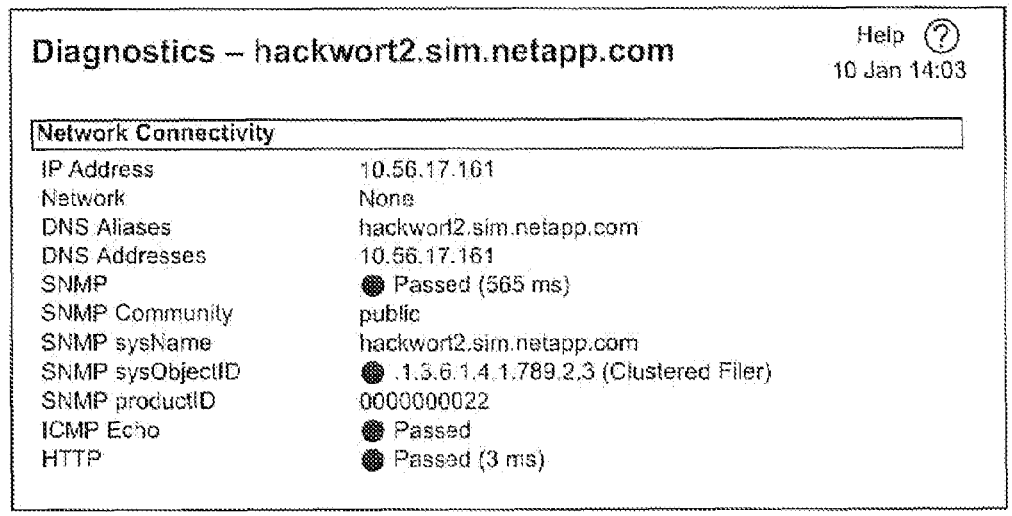

FIGS. 8 and 9 show additional examples of screen displays that may result from the diagnostic process, such as may be generated after the administrator has performed troubleshooting procedures. Note that the results of using the different protocols are different between these figures and FIG. 7.

Figure 10:
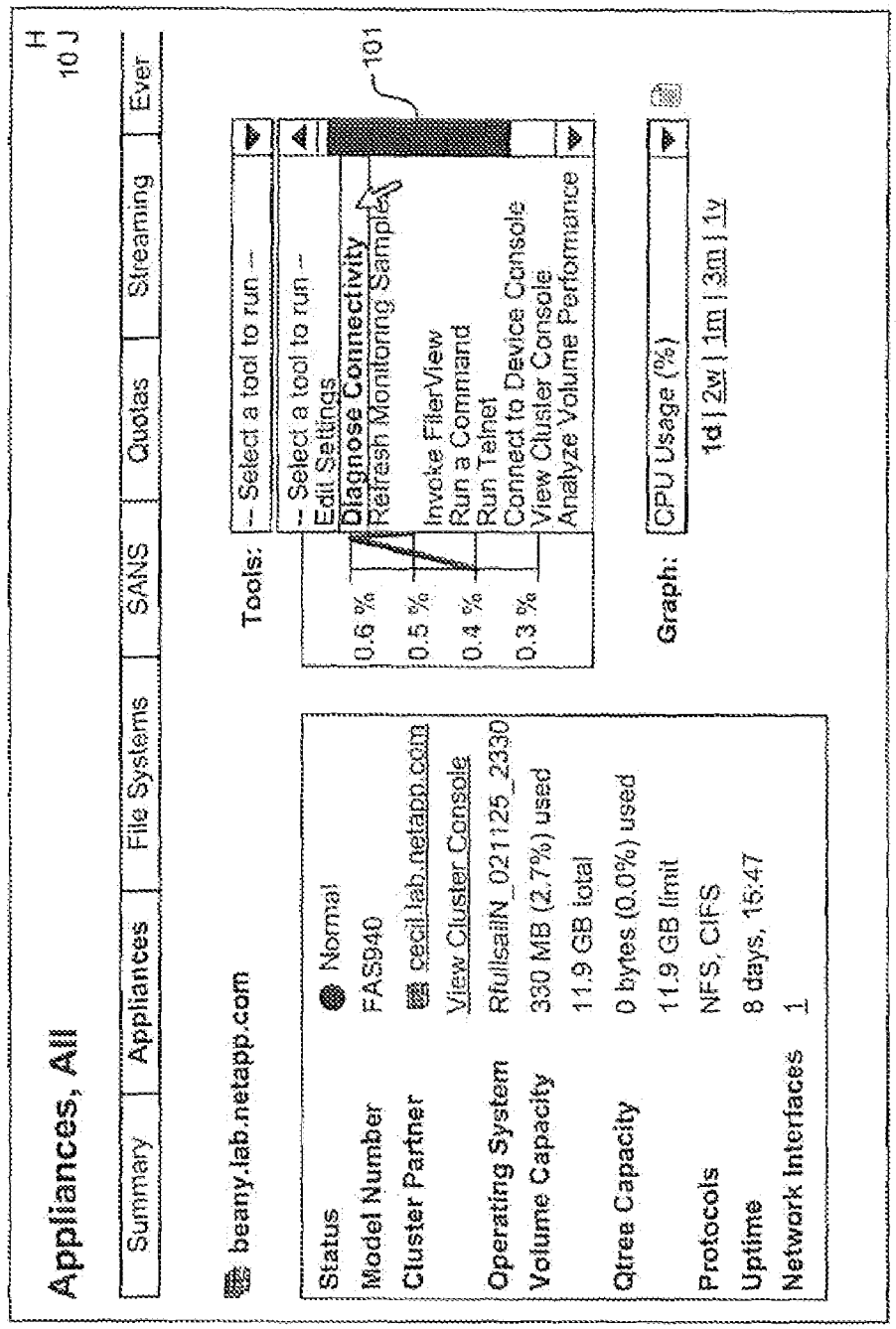
FIG. 10 shows an example of a screen display from which the diagnostic process can be triggered with respect to a managed device.
Figure 11:
FIG. 11 shows an example of the screen display that results from the diagnostic process being performed on a managed device.

The diagnostic process is not limited to use when there is a problem adding an unmanaged device to the set of managed devices. For example, the diagnostic process can be useful when a connectivity problem is detected with a managed device. FIG. 10 shows an example of a screen display from which the diagnostic process can be triggered with respect to a managed device. For a particular managed device, the user can request the diagnostic process to diagnose connectivity to the device using a pull down menu 101. The results of running the diagnostic process may be presented in a screen display such as shown in FIG. 11. Note that the diagnostic results are more detailed for a managed device (e.g., FIG. 11) than for an unmanaged device (e.g., FIGS. 7, 8 and 9).

Figure 12A:
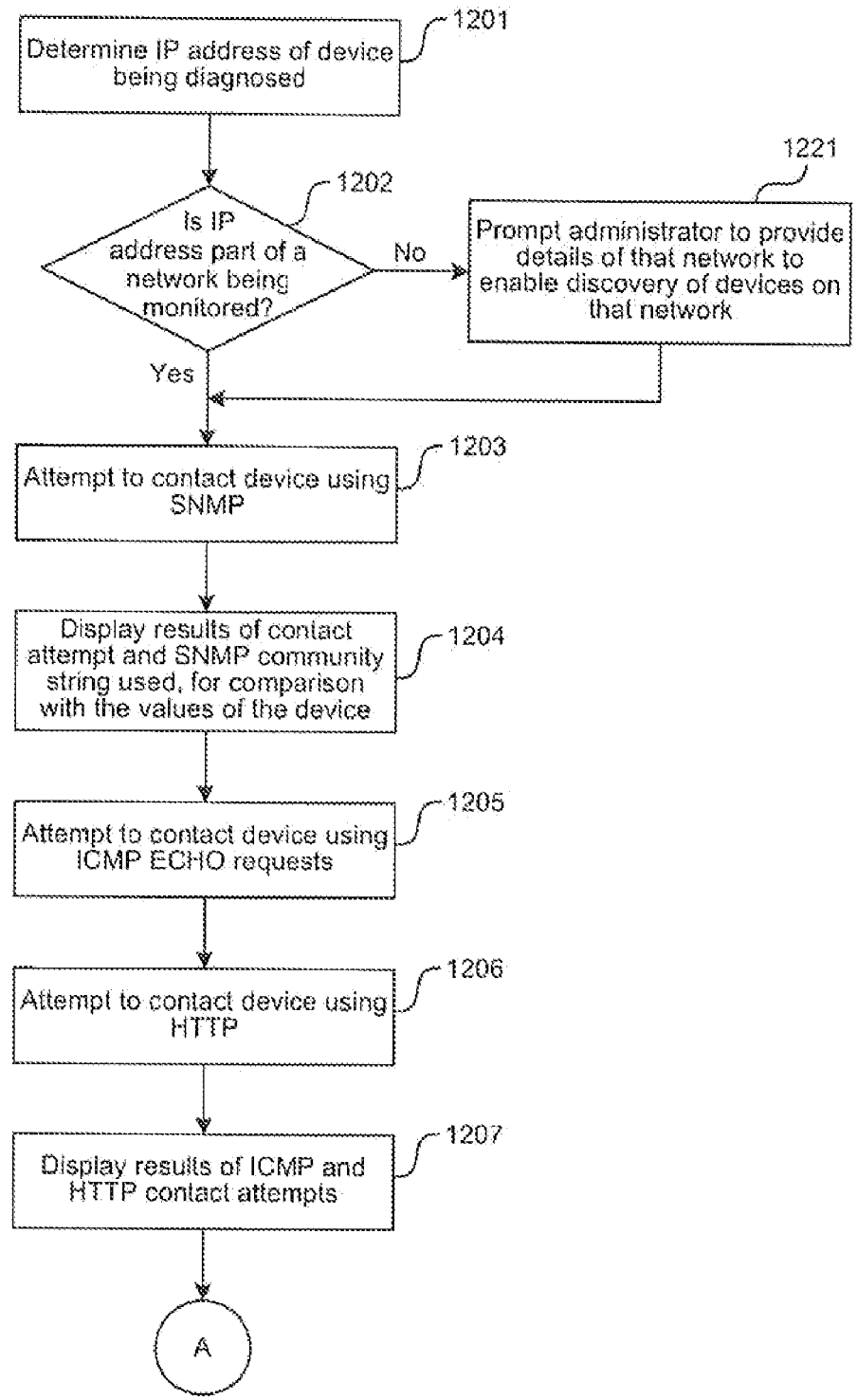
FIGS. 12A through 12C are a flow diagram of the diagnostic process according to one embodiment of the invention.
Figure 12B:
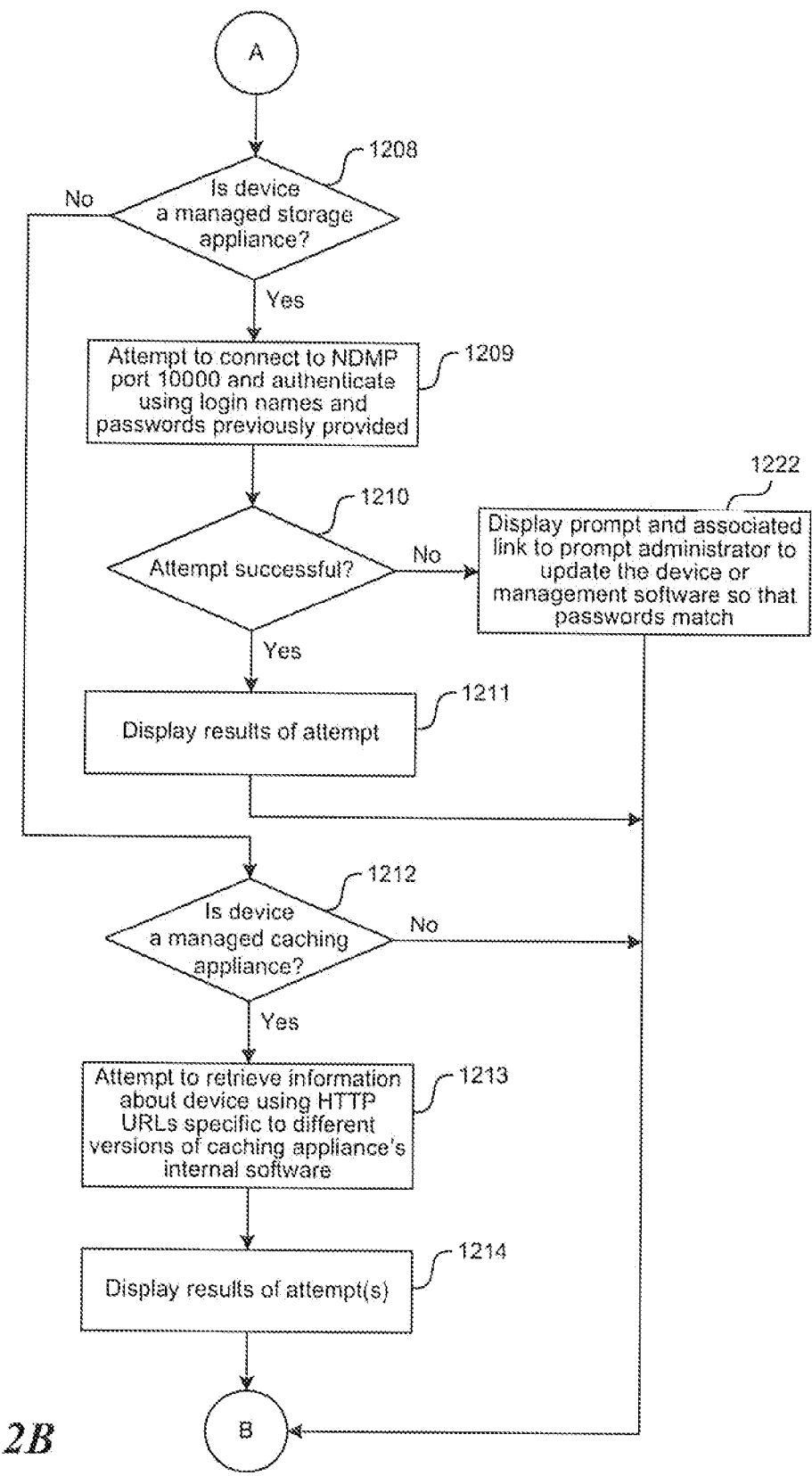
Figure 12C:
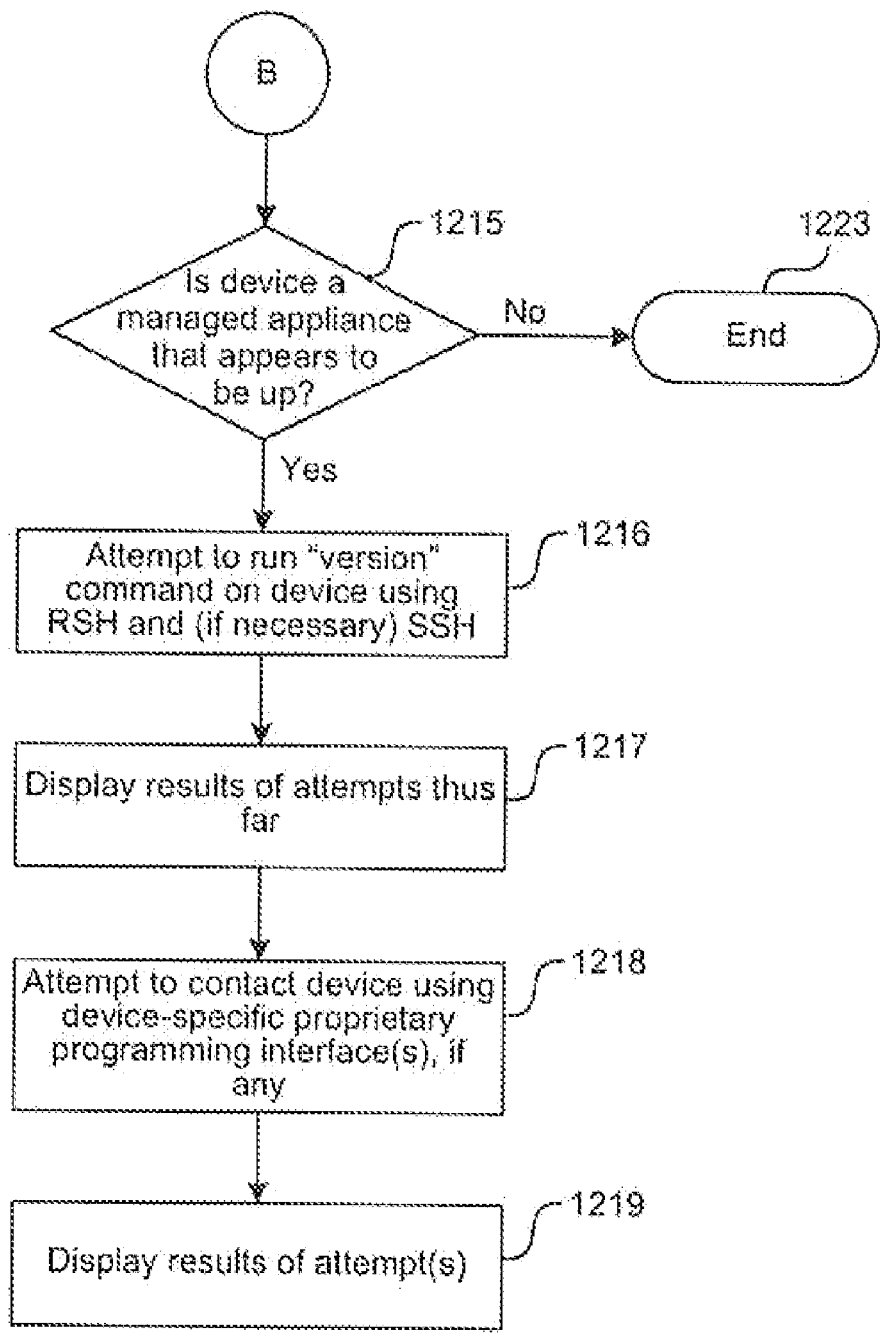

FIGS. 12A through 12C show the diagnostic process according to one embodiment of the invention. Initially, at block 1201 the diagnostic process determines the Internet protocol (IP) address of the device being diagnosed. For a managed device, the address is retrieved from the database 24 in the management station 9. The diagnostic process compares the address returned by the domain name system (DNS) to the address retrieved from the database 24. A mismatch indicates that the administrator should correct either the DNS entries or the database entry.

For an unmanaged device for which the administrator provided an IP address, that address is used.

If the administrator entered a device name, the DNS is used to resolve the name to an address.

At block 1202, the diagnostic process determines whether the address of the device is part of one of the networks that the management station 9 is managing. If the address is not part of a managed network, the diagnostic process prompts the administrator at block 1221 to provide details of that network (i.e., its address and network mask) to enable the diagnostic process to discover devices on that network.

Next, at block 1203 the diagnostic process attempts to contact the device using SNMP. In particular, the diagnostic process collects the "sysObjectID" and "sysName" variables (see RFC 1155). If this attempt fails, one of several problems could be the cause: 1) the device may be down; 2) the device may have SNMP disabled; 3) the device may require a different SNMP Community (the GUI may provide a link to fix this problem); or 4) network devices between the management station 9 and the device may disallow SNMP traffic. At block 1204 the diagnostic process displays the results of the SNMP request, as well as the SNMP Community string it used, for comparison with the values on the device.

At block 1205 the diagnostic process attempts to contact the device using ICMP ECHO requests. Failure of these requests may indicate that the device is not powered on or connected to the network. At block 1206 the diagnostic process attempts to contact the device using HTTP. Specifically, the diagnostic process tries to open the HTTP port (80) on the device. If block 1205 succeeds but block 1206 fails, it is likely that a router, switch, or firewall is configured to block HTTP traffic, and that device needs to be reconfigured. Similarly, if block 1206 succeeds but block 1205 fails, a router, switch, or firewall is configured to block SNMP traffic, and that device needs to be reconfigured. The results of blocks 1203 through 1206 are displayed in the GUI at block 1207.

Next, the diagnostic process determines whether the device is a managed network storage appliance 5 (block 1208) or a managed network caching appliance 6 (block 1212) (although it might be neither). The device is a managed device if its name or address is in database 24. If the device is a managed device, the type of device can be determined from its device type data stored in database 24. Thus, if the device is a managed storage appliance 5, the diagnostic process attempts at block 1209 to connect to the NDMP port 10000 and to authenticate the device using the login names and passwords previously provided to the management software 10. If the attempt is successful (block 1210), the results are displayed at block 1211. If the attempts fail, the diagnostic process prompts the administrator at block 1222 to update either the device or the management software 10 so that the passwords match. The GUI may provide a link to fix this problem.

If the device is a managed network caching appliance 6 (block 1212), the diagnostic process attempts to retrieve information about the device, using one or more HTTP uniform resource locators (URLs) specific to different versions of the internal software of those devices. For example, a first URL may link to detailed system information about the device, while a second URL may link to information about the network interface cards on the device.

If the device is not a managed storage appliance 5 or caching appliance 6, but it is a managed appliance that appears to be operative (block 1215), the diagnostic process attempts at block 1216 to run a "version" command (or the like) on the device using remote shell (RSH) and, if that fails, using secure remote shell (SSH). If these attempts fail, but the preceding access attempts succeeded, the device is using a different password than the one configured in the management software 10, and the resulting display (block 1217) prompts the administrator to adjust either the management software 10 or the device so that the passwords agree.

Also if the device is a managed appliance that appears to be operative, the diagnostic process also attempts to contact the device using any device type-specific programming interfaces (which could be proprietary) that are known to the management software 10, if any. As noted above, examples of such device type-specific programming interfaces might include one or more forms of XML and/or SOAP over HTTP. As a more specific example, for a particular type of network storage appliance, the diagnostic process might attempt a "volume-list" request (or the like) using XML-over-HTTP interfaces defined for such devices. The requests might have the form "<volume-list/>", while a response might have the following form:

```

<volumes>
        <volume-info>
            <name>vol0(1)</name>
            <state>failed</state>
        </volume-info>
        <volume-info>
            <name>slam1</name>
            <state>online</state>
        </volume-info>
        <volume-info>
            <name>shared</name>
            <state>online</state>
        </volume-info>
        <volume-info>
            <name>vol0</name>
            <state>online</state>
        </volume-info>
    </volumes>

```

Figure 13:
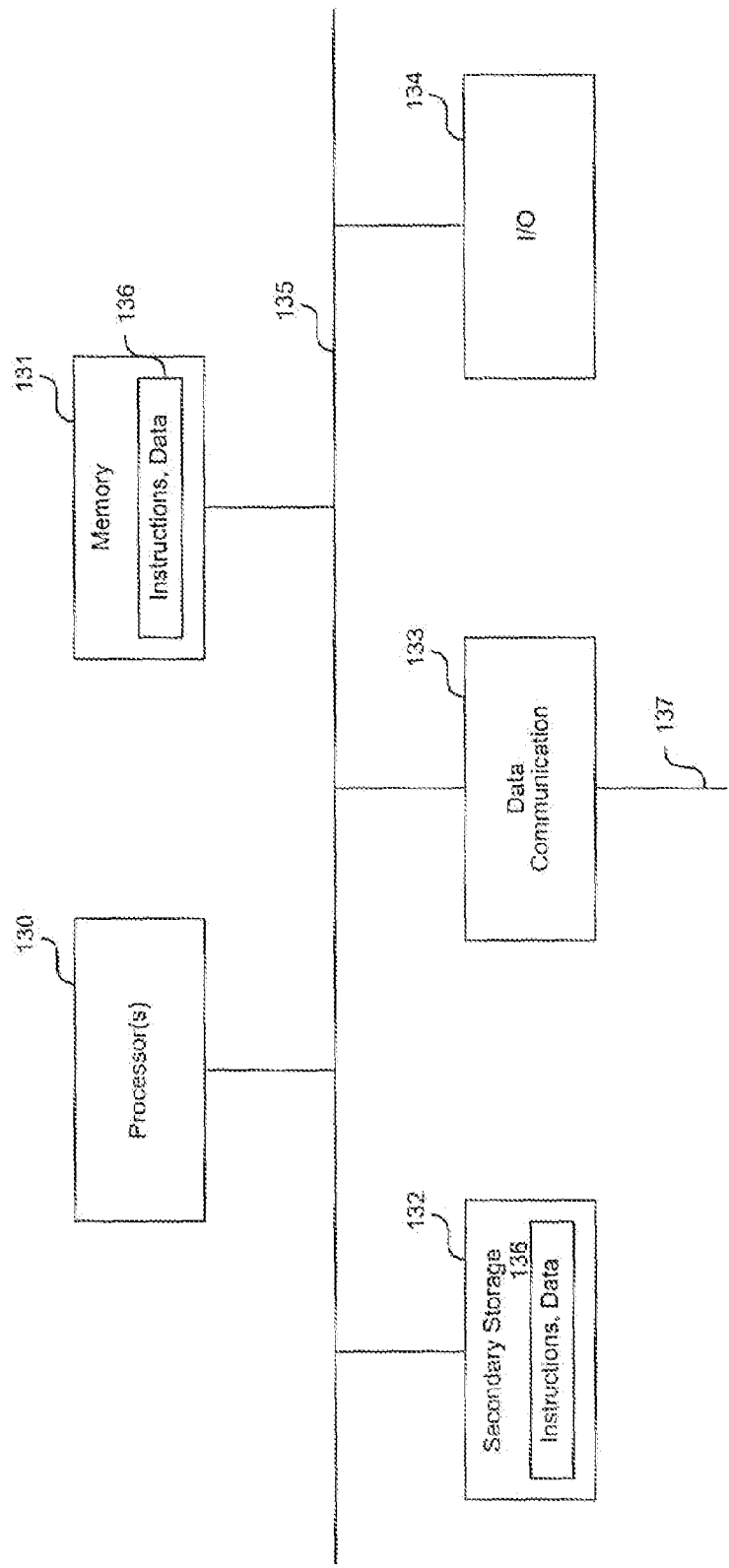
FIG. 13 is a high-level block diagram of a processing system.

Any of the processing systems illustrated in FIG. 1 (e.g., the management station 9, the storage appliances 5, the caching appliances 6, etc.) can be implemented using well-known hardware components arranged in conventional architectures. FIG. 13 is a high-level block diagram showing an example of such a processing system. Note that FIG. 13 is a conceptual representation which represents any of numerous possible specific physical arrangements of hardware components; however, the details of such arrangements are not germane to the present invention and are well within the knowledge of those skilled in the art. Also note that, in certain embodiments, some of the above-mentioned processing systems can be distributed between two or more separate (but interconnected) physical devices.

The processing system shown in FIG. 13 includes one or more processors 130, i.e. a central processing unit (CPU) and memory 130 connected to a bus system 135. Memory 131 may include read-only memory (ROM), random access memory (RAM), Flash memory, and/or other types of memory, or a combination thereof. Also coupled to the bus system 135 are secondary storage 132 (e.g., one or more non-volatile mass storage devices), a data communication device 133, and in some embodiments, one or more additional input/output (I/O) devices 134.

The processor(s) 130 may be, or may include, one or more programmable general-purpose or special-purpose microprocessors or digital signal processors (DSPs), microcontrollers, application specific integrated circuits (ASICs), programmable logic devices (PLDs), or a combination of such devices. The bus system 135 includes one or more buses or other physical connections, which may be connected to each other through various bridges, controllers and/or adapters such as are well-known in the art. For example, the bus system 135 may include a "system bus", which may be connected through one or more adapters to one or more expansion buses, such as a Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire"). In alternative embodiments, some or all of the aforementioned components may be connected to each other directly, rather than through a bus system.

The secondary storage 132 may be, or may include, any one or more devices suitable for storing large volumes of data in a non-volatile manner, such as a magnetic disk or tape, magneto-optical (MO) storage device, or any of various types of Digital Versatile Disk (DVD) or Compact Disk (CD) based storage, or a combination of such devices.

The communication device 133 is a device suitable for enabling the processing system to communicate data with a remote processing system over a communication link 137, and may be, for example, a conventional telephone modem, a wireless modem, an Integrated Services Digital Network (ISDN) adapter, a Digital Subscriber Line (DSL) modem, a cable modem, a radio transceiver, a satellite transceiver, an Ethernet adapter, or the like.

The I/O device(s) 134 may include, for example, one or more of: a pointing device such as a mouse, trackball, touchpad, or the like; a keyboard; audio speakers; and/or a display device such as a cathode ray tube (CRT), a liquid crystal display (LCD), or the like. However, such I/O devices may be omitted in a system that operates exclusively as a server and provides no direct user interface. Other variations upon the illustrated set of components can be implemented in a manner consistent with the invention.

Software (including instructions and data) 136 to implement the techniques described above may be stored in memory 131, secondary storage 132, or both. In certain embodiments, the software 136 may be loaded into the processing system by downloading it from a remote processing system through the communication device 133.

Note that while the diagnostic process and other features are described above as being software-implemented, in alternative embodiments some or all of these features can be implemented in circuitry specially designed for such purposes, or in a combination of specially designed circuitry and software.

Thus, a method and apparatus for a network management station to diagnose a connectivity problem on a network have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    generating a user interface to enable a user of a network management station to control management functions on a set of devices managed by the network management station via a network;
    in the network management station, detecting a connectivity problem related to accessing a device on the network;
    receiving, via the user interface, a command from the user of the network management station, the command for initiating a diagnostic process from the network management station in relation to the device;
    executing the diagnostic process from the management station in response to the command, wherein the diagnostic process includes applying a set of heuristics to diagnose the connectivity problem, including
        determining a device type to which the device belongs, from a plurality of device types that can be managed by the network management station;
        selecting a device type-specific protocol according to the device type to which the device belongs; and
        after determining the device type to which the device belongs, attempting to communicate with the device from the network management station by separately using each of a plurality of communication protocols, including said device type-specific protocol; and
    displaying to the user, via the user interface, results of the diagnostic process, including displaying information about the device and displaying individual results of attempts to communicate with the device with each of the plurality of communication protocols.

2. A method as recited in claim 1, wherein the device is a network appliance.

3. A method as recited in claim 1, wherein the device is a network storage appliance.

4. A method as recited in claim 1, wherein the device is a network caching appliance.

5. A method as recited in claim 1, wherein if the device is determined to be a network storage server, the device type-specific protocol comprises a communication protocol specific to a network storage server device type.

6. A method as recited in claim 1, wherein if the device is determined to be a network caching appliance, the device type-specific protocol comprises a communication protocol specific to a network caching appliance device type.

7. A method as recited in claim 1, wherein the device type-specific protocol is a version of XML.

8. A method as recited in claim 1, wherein the device type-specific protocol is a version of SOAP.

9. A method as recited in claim 1, wherein the plurality of communication protocols comprises: SNMP, ICMP, HTTP, and at least one of: NDMP, RSH or SSH.

10. A method as recited in claim 1, wherein said detecting a connectivity problem is in response to user input, from a user of the network management station, specifying a device to be added to a set of devices managed by the network management station.

11. A method for a network management station to diagnose a connectivity problem on a network, the method comprising:
    generating a user interface to enable a user of the network management station to control management functions on a set of devices managed by the network management station via a network;
    attempting to establish connectivity from the network management station to a device on the network in response to first user input from a user of the network management station via the user interface;
    in response to a connectivity problem being detected by the network management station during said attempting to establish connectivity to the device, prompting the user to enable the user to initiate execution of a diagnostic process to diagnose the connectivity problem;
    in response to receiving second user input via the user interface, executing the diagnostic process from the network management station in relation to the device, wherein the diagnostic process includes applying a set of heuristics to diagnose the connectivity problem, including
        determining a device type to which the device belongs, from a plurality of device types that can be monitored by the network management station, the plurality of device types including a network storage appliance device type and a network caching appliance device type; and
        attempting to communicate with the device using each of a plurality of communication protocols, wherein if the device is determined to be a network storage appliance, the plurality of communication protocols comprises a communication protocol specific to the network storage appliance device type, and if the device is determined to be a network caching appliance, the plurality of communication protocols comprises a communication protocol specific to the network caching appliance device type, and
    displaying to the user, via the user interface, results of the diagnostic process, including displaying information about the device and displaying individual results of attempts to communicate with the device with each of the plurality of communication protocols.

12. A network management station comprising:
a processor;
a web server coupled with the processor, to communicate with a web browser to generate a user interface enabling a user of the network management station to control management functions on a set of devices managed by the network management station via a network, and to receive, via the user interface, a command from the user of the network management station, the command for initiating a diagnostic process from the network management station in relation to a device on the network; and
a monitor unit coupled with the processor, the monitor unit to monitor the set of, the monitor unit further
to detect a connectivity problem associated with the device, and
to execute a diagnostic process in response to a command received from a user of the management station via the user interface, wherein the diagnostic process includes applying a set of heuristics to diagnose the connectivity problem, including determining a device type to which the device belongs, from a plurality of device types that can be managed by the network management station; selecting a device type-specific protocol according to the device type to which the device belongs; and after determining the device type to which the device belongs, attempting to communicate with the device by separately using each of a plurality of communication protocols, including said device type-specific protocol;
wherein the web server is configured to cause the web browser to display to the user, via the user interface, results of the diagnostic process, including displaying information about the device and displaying individual results of attempts to communicate with the device with each of the plurality of communication protocols.

13. A network management station as recited in claim 12, wherein the device is a network appliance.

14. A network management station as recited in claim 13, wherein the device is a storage server.

15. A network management station as recited in claim 13, wherein the device is a caching appliance.

16. A network management station as recited in claim 12, wherein the monitor unit is configured to determine whether the device is a network file server, wherein if the device is determined to be a network file server, the device type-specific protocol comprises a communication protocol specific to a network file server device type.

17. A network management station as recited in claim 12, wherein the monitor unit is configured to determine whether the device is a network caching appliance, wherein if the device is determined to be a network caching appliance, the device type-specific protocol comprises a communication protocol specific to a network caching appliance device type.

18. A network management station as recited in claim 12, wherein the plurality of communication protocols comprises: SNMP, ICMP, HTTP, and at least one of: NDMP, RSH or SSH.

19. A network management station as recited in claim 18, wherein the plurality of protocols further comprises a version of SOAP.

20. A network management station as recited in claim 18, wherein the plurality of protocols further comprises a version of XML.

21. A network management station as recited in claim 12, wherein said attempting to establish connectivity to a device on the network is in response to user input, from a user of the network management station, specifying a device to be added to a set of devices managed by the network management station.

22. A network management station as recited in claim 12, wherein said executing the diagnostic process to diagnose the connectivity problem is in response to user input from a user of the network management station.

23. A network management station comprising:
a processor;
a communication device to enable the network management station to communicate over a network with a plurality of devices managed by the network management station; and
a memory storing management software which, when executed by the processor, causes the network management station to perform a process which includes
generating a user interface to enable a user of the network management station to control management functions on the plurality of devices;
attempting to establish connectivity to a device on the network,
detecting a connectivity problem during said attempting to establish connectivity to the device,
receiving, via the user interface, a command from the user of the network management station, the command for initiating a diagnostic process from the network management station in relation to the device;
executing the diagnostic process in response to the command to diagnose the connectivity problem, the diagnostic process including applying a set of heuristics to diagnose the connectivity problem, including
determining a device type to which the device belongs, from a plurality of device types that can be managed by the network management station;
selecting a device type-specific protocol according to the device type to which the device belongs; and
after determining the device type to which the device belongs, attempting to communicate with the device by separately using each of a plurality of communication protocols, including said device type-specific protocol, and
displaying to the user, via the user interface, results of the diagnostic process, including displaying information about the device and displaying individual results of attempts to communicate with the device with each of the plurality of communication protocols.

24. A network management station as recited in claim 23, wherein the device is a network appliance.

25. A network management station as recited in claim 24, wherein the device is a storage server.

26. A network management station as recited in claim 24, wherein the device is a caching appliance.

27. A network management station as recited in claim 23, wherein determining a device type to which the device belongs comprises determining whether the device is a network file server, wherein if the device is determined to be a network file server, the device type-specific protocol comprises a communication protocol specific to a network file server device type.

28. A network management station as recited in claim 23, wherein determining a device type to which the device belongs comprises determining whether the device is a network caching appliance, wherein if the device is determined to be a network caching appliance, the device type-specific protocol comprises a communication protocol specific to a network caching appliance device type.

29. A network management station as recited in claim 23, wherein the plurality of communication protocols comprises: SNMP, ICMP, HTTP, and at least one of: NDMP, RSH or SSH.

30. A network management station as recited in claim 29, wherein the plurality of protocols further comprises a version of SOAP.

31. A network management station as recited in claim 29, wherein the plurality of protocols further comprises a version of XML.

32. A network management station as recited in claim 23, wherein said attempting to establish connectivity to a device on the network is in response to user input, from a user of the network management station, specifying a device to be added to a set of devices managed by the network management station.

33. A network management station as recited in claim 23, wherein said process is executed in response to user input from a user of the network management station.

34. A network management station comprising:
  means for generating a user interface to enable a user of the network management station to control management functions on a set of devices managed by the network management station via a network;
  means for detecting a connectivity problem related to accessing a device on the network;
  means for receiving, via the user interface, a command from the user of the network management station, the command for initiating a diagnostic process from the network management station in relation to the device;
  means for executing the diagnostic process in response to the command to diagnose the connectivity problem, the diagnostic process including applying a set of heuristics, including
    determining a device type to which the device belongs, from a plurality of device types that can be managed by the network management station;
    selecting a device type-specific protocol according to the device type to which the device belongs; and
    attempting to communicate with the device from the network management station after determining the device type to which the device belongs, by separately using each of a plurality of communication protocols, including said device type-specific protocol; and
  means for displaying to the user, via the user interface, results of the diagnostic process, including displaying information about the device and displaying individual results of attempts to communicate with the device with each of the plurality of communication protocols.

35. A method as recited in claim 1, wherein the plurality of device types that can be managed by the network management station comprise a storage server device type and a network caching appliance device type, wherein if the device is determined to be a network storage server, the device type-specific protocol comprises a communication protocol specific to a network storage server device type, and wherein if the device is determined to be a network caching appliance, the device type-specific protocol comprises a communication protocol specific to a network caching appliance device type.

36. A network management station as recited in claim 12, wherein the plurality of device types that can be managed by the network management station comprise a storage server device type and a network caching appliance device type, wherein if the device is determined to be a network storage server, the device type-specific protocol comprises a communication protocol specific to a network storage server device type, and wherein if the device is determined to be a network caching appliance, the device type-specific protocol comprises a communication protocol specific to a network caching appliance device type.

37. A network management station as recited in claim 23, wherein the plurality of device types that can be managed by the network management station comprise a storage server device type and a network caching appliance device type, wherein if the device is determined to be a network storage server, the device type-specific protocol comprises a communication protocol specific to a network storage server device type, and wherein if the device is determined to be a network caching appliance, the device type-specific protocol comprises a communication protocol specific to a network caching appliance device type.

38. A method comprising:
  generating a user interface to enable a user of a network management station to control management functions on a set of devices managed by the network management station via a network;
  in the network management station, detecting a connectivity problem related to accessing a device which is a network storage server or a network caching device on the network;
  receiving, via the user interface, a command from the user of the network management station, the command for initiating a diagnostic process from the network management station in relation to the device;
  executing the diagnostic process from the management station in response to the command, wherein the diagnostic process includes applying a set of heuristics to diagnose the connectivity problem, including:
    determining a device type to which the device belongs, that can be managed by the network management station, wherein the device type is one of: network storage server or network caching device;
    selecting a device type specific protocol according to the device type to which the device belongs; and
    after determining the device type to which the device belongs, attempting to communicate with the device from the network management station by using each of a plurality of communication protocols; including said device type specific protocol; and
  displaying to the user, via the user interface, results of the diagnostic process, including displaying information about the device and displaying individual results of attempts to communicate with the device with each of the plurality of communication protocols.

39. A method as recited in claim 38, wherein if the device is determined to be a network storage device, the device type-specific protocol comprises a communication protocol specific to a network storage device type.

40. A method as recited in claim 38, wherein if the device is determined to be a network caching device, the device type-specific protocol comprises a communication protocol specific to a network caching device type.

41. A method as recited in claim 38, wherein the device type-specific protocol is a version of XML.

42. A method as recited in claim 38, wherein the device type-specific protocol is a version of SOAP.

43. A method as recited in claim 38, wherein the plurality of communication protocols comprises: SNMP, ICMP, HTTP, and at least one of: NDMP, RSH or SSH.

* * * * *